United States Patent [19]

Varveris et al.

[11] Patent Number: 5,355,184

[45] Date of Patent: Oct. 11, 1994

[54] FRAME FOR EYEGLASSES HAVING FLEXIBLE STRAPS LENS RETAINERS

[75] Inventors: Nicholas G. Varveris, 538 Churchill Ave., Palo Alto, Calif. 94301; John P. Valenti, San Martin, Calif.

[73] Assignee: Nicholas G. Varveris, Palo Alto, Calif.

[21] Appl. No.: 45,999

[22] Filed: Apr. 9, 1993

[51] Int. Cl.5 .............................................. G02C 1/04
[52] U.S. Cl. .................................. 351/106; 351/103; 351/154
[58] Field of Search ............... 351/106, 103, 104, 105, 351/107, 108, 109, 41, 69, 76, 136, 137, 154, 92, 110, 142

[56] References Cited

U.S. PATENT DOCUMENTS

| | | | |
|---|---|---|---|
| 4,021,103 | 5/1977 | Gaspari | 351/126 |
| 4,432,616 | 2/1984 | Kurosaka | 351/106 |
| 4,464,025 | 8/1984 | Lhospice | 351/106 |
| 4,466,713 | 8/1984 | Tanaka | 351/106 |
| 4,550,989 | 11/1985 | Hafner | 351/106 |
| 4,842,399 | 6/1989 | Tsai | 351/106 |

*Primary Examiner*—William L. Sikes
*Assistant Examiner*—Hung Xuan Dang
*Attorney, Agent, or Firm*—Skjerven, Morrill, MacPherson, Franklin, & Friel

[57] ABSTRACT

An eyeglass frame, particularly suitable as a temporary or permanent frame for a broken frame or as a replacement frame, has a central nose-piece; at least one pair of flexible straps extending from the nose-piece or an intermediate fixed top bar; and separate or integral ratcheting clasps. Each of the straps has a transverse ratchet surface adjacent its distal end and each clasp has a ratcheting mechanism such as a flexible pawl. Each of the loose lenses of the eyeglasses are mounted against the nose-piece and each strap in seriatim is wrapped around the periphery of a lens with the distal end of the strap inserted into the ratcheting clasp and pulled therethrough so that the strap ratchet surfaces intermeshes with the pawl or pawls of the ratcheting clasps so as to cinch-up and tighten the strap(s) around the lens. Temple bars are attachable to the clasps. Any excess length of strap extending outwardly from the clasp(s) are cut-off. Marking of the correct optical position and alignment of the lenses in the old frame for use in alignment of those lenses in the replacement frame is also provided for.

25 Claims, 6 Drawing Sheets

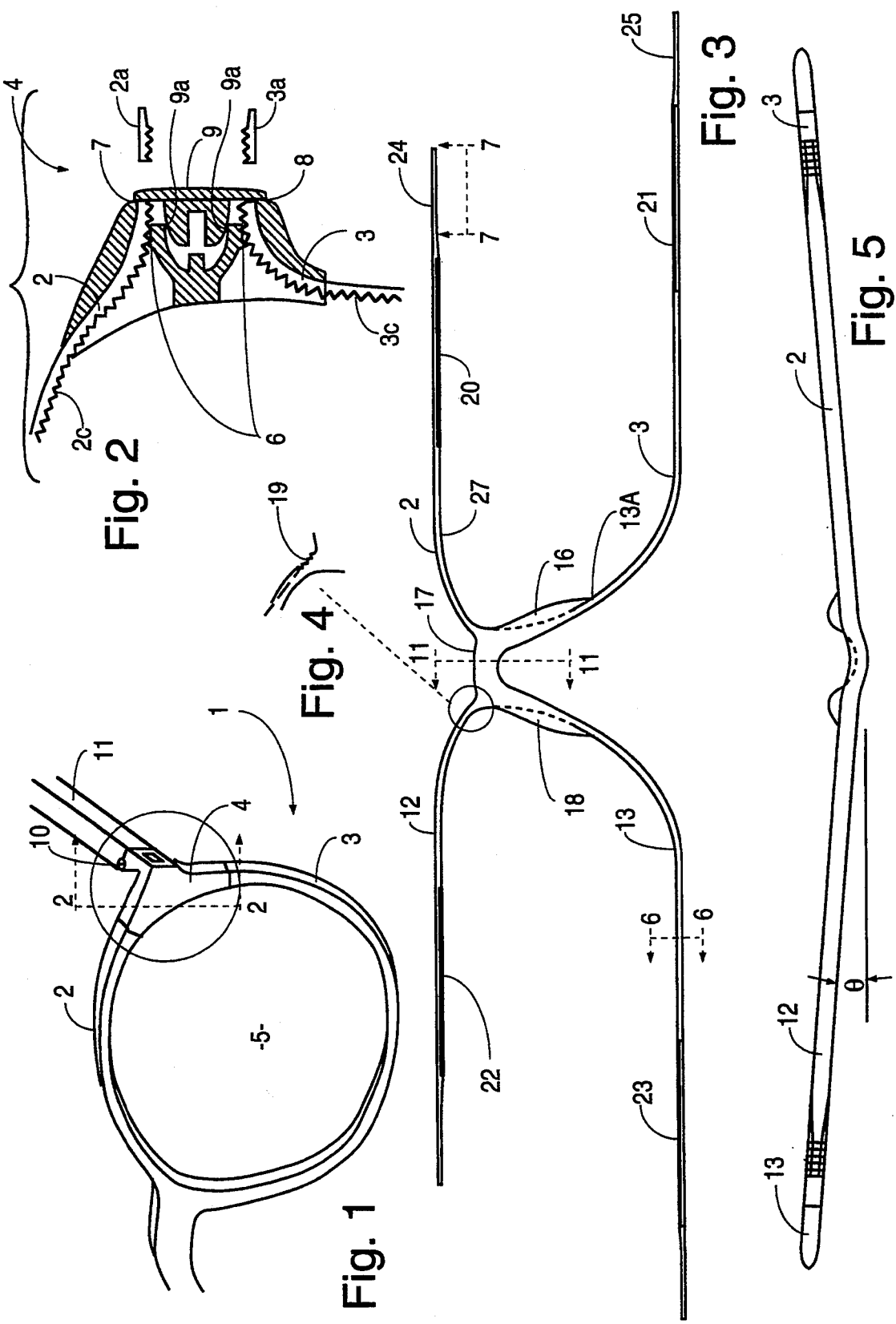

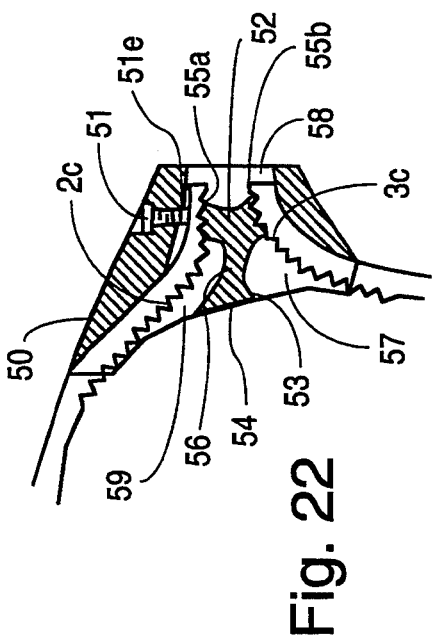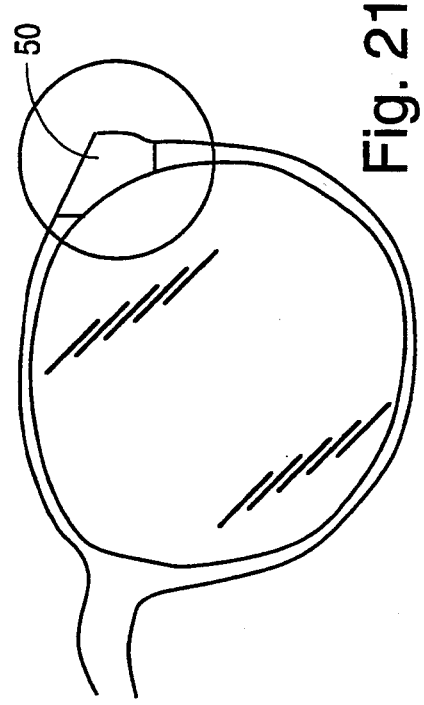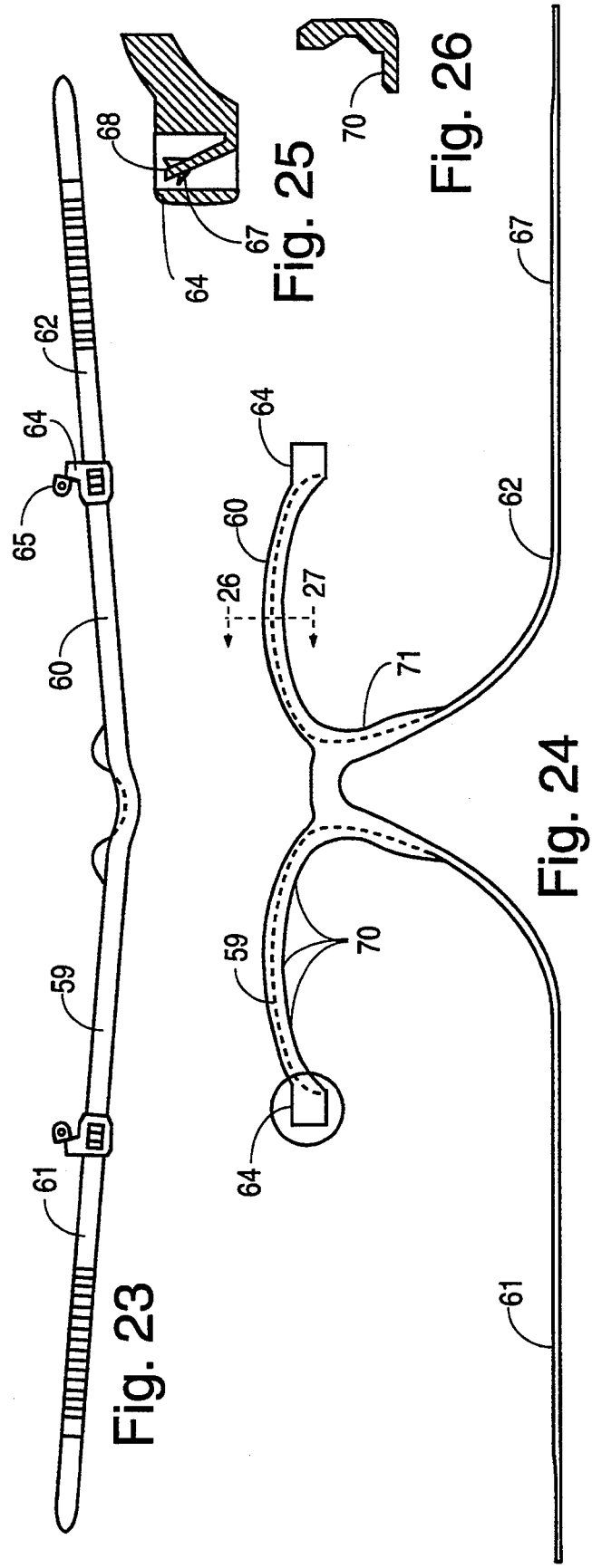

FRAME FOR EYEGLASSES HAVING FLEXIBLE STRAPS LENS RETAINERS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention concerns eyeglass frames. More particularly the invention is directed to a frame which can be used as a replacement frame for bent or broken frames while utilizing the sight-correcting lens or other sun or other protective plain lens of the unusable frame.

This invention relates to spectacles and more particularly to a "universal" or variable dimension eyeglass frame wherein the rims of the frame can be adjusted in length and shape to accommodate almost any size and shape of lens. Such a frame can be used as a temporary replacement of a person's normal frame when broken or as a low cost fashion alternative frame.

Typically when a person breaks their eyeglass frame they have few choices to fix it. They can attempt to tape or glue the broken portion, or attempt to obtain a replacement part. However, the former alternative usually results in an unattractive appearance, and the latter is usually not available because of the rapid changes in eyeglass styles and the limited inventories maintained by eyeglass frame vendors. Even if a replacement frame is still in a manufacturer's or distributor' stock it may be several days before it can be delivered to the retail establishment for assembly with the person's lenses. If a replacement frame is not available the person then must choose a new frame and have new lenses made which have an internal periphery to accommodate the chosen fixed opening in the newly chosen frame.

Traditional eyeglass frames are generally made of plastic, metal or a combination thereof, and are designed to hold a lens of a single specific design and shape. So called "semi-rimless" frames have greater versatility in that the bottom portion of the lens is typically retained by a flexible wire, strip or cord. This permits this type of frame to accommodate a greater variety of lens sizes. However, these frames have an upper rim portion which is of a fixed size and shape. Thus, they also can only accommodate lenses which have matching upper rims.

Since the dimensions of existing frames are completely or substantially fixed, each lens must be modified to satisfy the dimensions of the frame. If the lens is not modified properly, the lens may fit loosely or not fit in the frame at all. Modification of the lens requires the optician to work with great care, otherwise damage will result to the lens.

In a preliminary search no "temporary" or "universal" eyeglass frame was uncovered. U.S. Pat. Nos. 4,464,025; 4,466,713; 4,842,399; and 4,432,616 disclose spectacle (eyeglass) frames having fixed rigid rails or top-pieces which correspond in their inner periphery with a corresponding fixed upper peripheries of the two eyeglass lenses. Nose pad elements are provided attached either to the top rail in whole or in part. The lenses are held in the top rail by a flexible filament such as metal or Nylon plastic; a super elastic Ni—Ti alloy wire by a barbed nylon cord or a headed wire connected to the lower ends of the top rail, respectively in the three patents. All of these cords or wires are of fixed length. The '616 patent does permit mounting the headed wire in one of two fixing means in the top rail. U.S. Pat. No. 4,550,989 end pieces and threads with the threads soldered or welded to the end piece are provided. In a second embodiment clamping plates or bars are included. These constructions provide for the movement by the optician of the nose bridge and/or end pieces in fitting on an individual's face. The '989 patent envisions making lenses of various shapes and having threads, bands or wires of various fixed lengths to hold such lenses. In a dissimilar art, cable ties employ flat plastic strips with a serrated end and a pawl-containing clasp end.

SUMMARY OF INVENTION

The present invention may be termed to be a "universal" frame which is usable with a wide variety of lens sizes and shapes and can be easily mounted by a lay person with his or her existing lenses and either new temple bars or the temple bars of the existing broken frame transferred to the temporary frame firmly holding the lenses.

In accordance with the invention, a spectacle frame is provided wherein the lenses are retained within the confines of a variable length flexible strap or straps. In a first embodiment the strap(s) have a "V" shaped groove to match traditional lenses which have a "V" shaped bevel around their perimeter. In a second embodiment, a protrusion is provided on the strap(s) to match "semi-rimless" lenses that have a groove around their perimeter. The spectacle frame straps adjust to the size of the particular lens by means of ratchets on the strap and use of a ratcheting clasp. Excess strap can be easily removed without special tools. A scissors or nail clipper can be used. A variable dimension eyeglass frame is thus formed from a minimal number of inexpensive components. A frame results which can be easily modified to accommodate a wide variety of lens sizes and shapes.

The improved eyeglass frame with its variable dimensions, thus reduces tooling costs for manufacturing frames since one "universal" frame fits a variety of lenses and correspondingly reduces the cost of eyeglass frames to consumers. In one embodiment of the eyeglass frame a releasable ratcheting clasp is utilized to permit easy removal of the lens or adjustment of its position. The above construction permits the wearer to insert used lenses into a frame without a screwdriver or special tools. If desired an optician may adjust the position of the lenses up or down to allow a perfect individual fitting which is particularly important for bifocal lens wearers.

The "universal" eyeglass frame of this invention will also permit the creation of an eyeglass frame after market. For the first time individuals will be able to obtain inexpensive frames in a variety of styles and colors which will accommodate their existing lenses. The design enables them to install their lenses in the frame themselves, thus allowing them to readily change the appearance of their eyeglasses for fashion purposes. Optometrists or opticians also may provide such frames to their patients as temporary replacement or low cost alternative frames.

An additional feature of the present invention is the incorporation of markings or indicia on the frame components to insure consistent sizing of both lenses and help assure the proper orientation of the lenses within the frame.

BRIEF DESCRIPTION OF DRAWINGS

FIG. 1 is a partial perspective view of an assembled variable dimension eyeglass frame.

FIG. 2 is an enlarged cross-sectional front view taken on the line 2—2 in the circled portion of FIG. 1.

FIG. 3 is a front view of variable dimension eyeglass frame per se prior to lens mounting.

FIG. 4 is an enlarged cross-sectional view of a FIG. 3 circled portion of the upper lens retention strap at a flex point.

FIG. 5 is a top view of the variable dimension eyeglass frame.

FIG. 21 is a partial front view of an assembled variable dimension eyeglass frame.

FIG. 22 is an enlarged cross-sectional view of a second clasp embodiment circled in FIG. 21 in an assembled state.

FIG. 23 is a top view of a third embodiment of a variable dimension eyeglass frame.

FIG. 24 is a front view thereof.

FIG. 25 is an enlarged cross-sectional view of the circled clasp portion of FIG. 23.

FIG. 26 is a 90°-rotated cross-sectional view of the upper rim section taken on the line 26—26 in FIG. 24.

DETAILED DESCRIPTION

Figure 6:
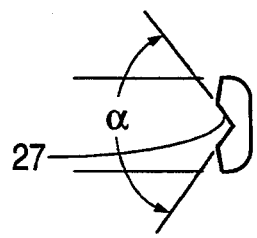
FIG. 6 is a cross-sectional view of lens retention strap taken along line 6—6 of FIG. 3.

FIG. 1 is illustrates one of a pair of eyeglass frames shown generally as 1. It includes an upper rim strap 2 and a lower rim strap 3 that together with a separate discrete ratcheting clasp 4 forms an enclosure that holds lens 5 in position within a frame formed by the straps 2 and 3 and the clasp. Temple bar 11 is attached to ratcheting clasp 4 with hinge components 10 of conventional construction. Rim straps 2 and 3 are formed with a groove or protrusion along their inner surfaces to complement the bevel or groove, respectively, provided around the peripheral edge of the typical optical lens 5. As shown in FIG. 2 a double ratcheting clasp 4 is used to secure and adjust the dimensions of the rim enclosure. Each rim strap 2 and 3 is insertable in the clasp 4 and independently secured and/or adjusted to have transverse ratchet surfaces 2c and 3c (FIG. 2) on the inside edges of the straps engage respective clasp ratchet pawls 6 at a linear location of the strap appropriate for the size and shape of a given lens. This is a critical element of the resultant eyeglass frame in order to facilitate the positioning of the optical center of the lens in relation to the center of the wearer's pupil. If clasp is an integral part of frame as in FIGS. 23 and 24, then top rim length becomes a critical length which must match or closely approximate a corresponding length for a given lens. Following the insertion of the lens 5 and adjustment and securement of the rim straps by the ratcheting connection, the excess of the distal end 2a and 3a of the straps is cut off flush with the outside of the clasp with a scissors, nail clipper or other simple tool. End cap 9 can then be inserted in the clasp opening to hide the opening and to further compressively lock the flexible ratchet pawls against the rim straps by ramp action of the inclined surfaces 9a.

In the above preferred embodiment of the invention upper and lower rim straps 2 and 3 and 12 and 13 (FIG. 3) on the opposite side of the frame are of one-piece construction integral with an upper nose bridge 17 and nose pads 16 and 18, as a single molded piece. An alternative embodiment of the invention (not shown) contemplates right and left rim straps fastened by mechanical means to separate bridge or combination bridge/nose pad components.

Figure 9:
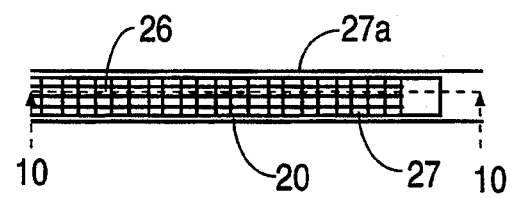
FIG. 9 is a bottom view of linear portion B of the upper lens retention strap end.
Figure 10:
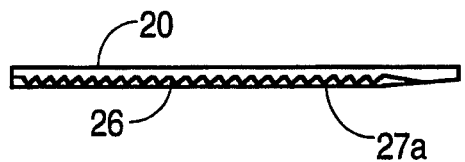
FIG. 10 is a cross-section view thereof.

As seen in FIG. 3 sections 20, 21, 22 and 23 of rim straps are formed with a groove 27 (FIG. 6) typically having an included angle a of about 110° or protrusion along their inner surfaces to compliment the bevel or groove, respectively, found along the peripheral edge of the typical optical or sun lens. The groove or protrusion may run the entire length of rim (except tail ends) not just on the ratcheted sections. In addition, these sections of the rim straps have a series of angular grooves ("ridges") 26 (FIGS. 9 and 10) running perpendicular to the length of the strap. The groove, protrusions, and ridges are on the inner surface of the strap so they are not visible once the frame is assembled with the lens inserted. In addition the series of perpendicular grooves or ridges do not extend across the entire width of the strap. This leaves bands 27a (FIG. 9) which run along the edge of the ridged sections of the rim straps and which hide the ridges when the rim straps are viewed from the side.

As seen in FIG. 4 the upper rim straps have a multiple ribbed section 19 forming a flex point for bending the strap. This gives each strap greater flexibility to facilitate wrapping the strap around acute angles of certain lens shapes adjacent the nose-piece.

As shown in FIG. 3 the length of the upper and lower rim straps are different. This is so the upper strap can reach just below the midpoint of the side of large lenses and the bottom strap must reach to the upper outside corner in order to accommodate the temple placement of some eyeglass frames. FIG. 5 shows that the rim straps are molded or connected to the bridge at an angle Θ of about 5° in order to approximate the lens positioning of standard eyeglass frames.

Figure 7:
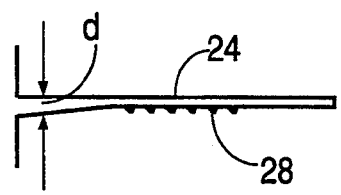
FIG. 7 is a side view of an end portion of upper lens retention strap taken along line 7—7 of FIG. 3.
Figure 8:
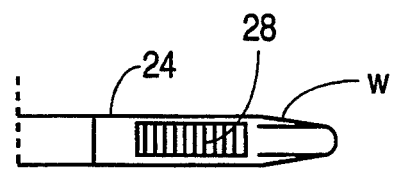
FIG. 8 is a bottom view thereof.
Figure 12:
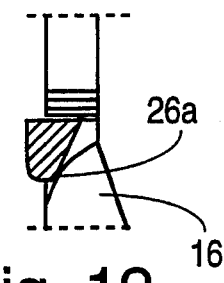
FIG. 12 is an enlarged view of the circled portion in FIG. 11.
Figure 11:
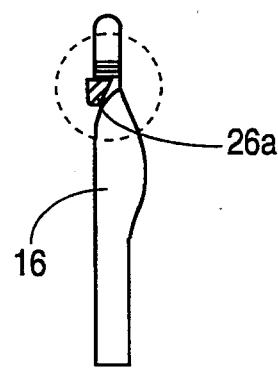
FIG. 11 is a cross-sectional view of the bridge taken along line 11—11 of FIG. 3.
Figure 13:
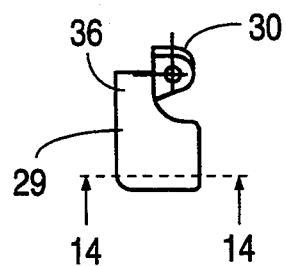
FIG. 13 is a top view of a double ratcheting eyeglass clasp with an integrated hinge component for corner-mounted temple bars.
Figure 17:
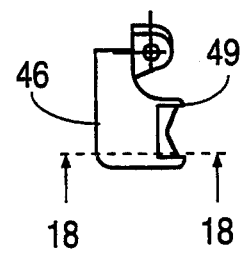
FIG. 17 is a top view of a double ratcheting eyeglass clasp with an integrated hinge component for side-mounted temple bars.
Figure 14:
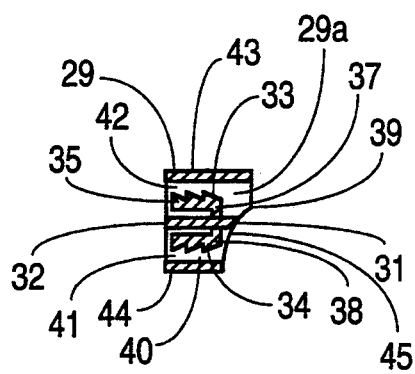
FIG. 14 is a cross-sectional side view thereof taken on the line 14—14 in FIG. 13.
Figure 18:
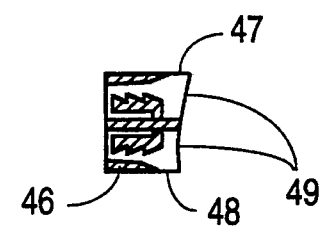
FIG. 18 is a cross-sectional side view thereof taken on the lines 18—18 on FIG. 17.

FIGS. 7 and 8 show that the distal end 24 of each rim strap is tapered in width w and depth d in order to facilitate its insertion into the ratcheting clasp 4. The distal end 24 also has a series of ridges 28 on its outer surface. These ridges provide a surface that can be gripped by the frame assembler and which will resist slippage as the assembler pulls the rim strap through the clasp and tightens it against the lens during the ratcheting step. FIGS. 11 and 12 show the cross-section of the nose-pads 16 and the upper nose bridge 26a.

Figure 15:
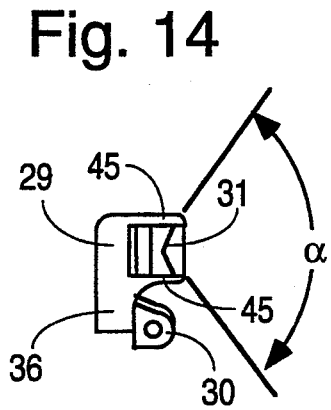
FIG. 15 is a bottom view thereof.
Figure 19:
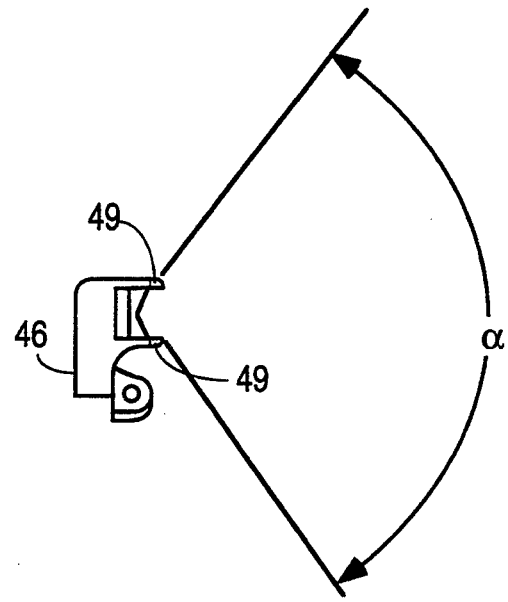
FIG. 19 is a bottom view thereof.
Figure 16:
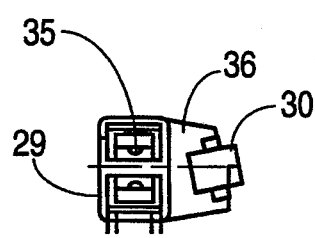
FIG. 16 is a 90°-rotated side view thereof.
Figure 20:
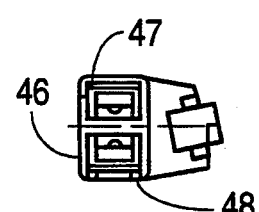
FIG. 20 is a 90°-rotated side view thereof.

In FIGS. 13–16 a construction for eyeglass frames with corner-mounted temples is seen in relation to a double ratcheting eyeglass clasp component 29. This construction includes an integrated hinge component 30 for attachment of a temple bar. As discussed above, the clasp 29 has two ratcheting pawls 33 and 34 attached to a ratchet support post 32. The ratchet support post holds the ratchet pawls in place within the clasp. The end 31 of the ratchet post has a groove or protrusion to complement and mate with the bevel or groove, respectively, of the intended lens. The teeth of the ratchet pawls 33 and 34 are designed to compliment the ratchet surface ridges (2c and 3c in FIG. 2) in the rim straps and mate with them when the strap is inserted, ratcheted and cinched up. The ratchet pawls are connected to the ratchet post at points 37 and 38 with a sufficient thickness of material and shape so that the ratchet pawls will flex slightly allowing the rim strap to pass through the clasp in one direction but compressively cinching or pinning the strap against the outer walls 43 and 44 of the clasp when tension is placed on the strap in the other direction. The upper strap will enter the clasp through slot 29a and exit through opening 42. The bottom strap will enter through opening 40 and exit through opening 41. A small cup or dimple 35 at the outer end of each ratchet pawl will permit the insertion of a small probe (such as a ball point pen tip) in order to allow the user to selectively pull back and disengage the ratchet pawl from the rim strap. This will allow easy removal of the lens, or permit adjustment if the assembler accidentally inserted the strap too far making the rim enclosure too small. As seen in FIG. 15 the lens side edges 45 of the front and back side of the ratcheting clasp are arched to correspond with the common shape of lens corners for eyeglass frames with temples attached at their upper corners. The angle a namely 110° is the ANSI standard for the arc of the frame groove. The hinge component 30 of the clasp is attached to the temple arm 36 portion of the clasp. Positioning the hinge component on a temple arm behind the ratcheting portion of the clasp is done to insure adequate clearance for very thick lenses that may protrude behind the rim of the frame. It also provides a solid portion of the clasp where metal hinge components (if desired) can be anchored or embedded.

FIGS. 17–20 show a construction of a double ratcheting eyeglass clasp 46 component of the invention. It is designed for eyeglass frames with side mounted temples. It is substantially similar to clasp 29 described above. However, the upper rim strap enters the clasp from opening 47 on the top of the clasp. In addition, the lens sides of the clasp 49 have a more gradual arc.

The FIGS. 21 and 22 embodiment of clasp 50 utilizes a single ratchet pawl and a countersunk mechanical fastening device 51 (such as a self tapping screw). This version is designed for eyeglass frames with corner mounted temples. It includes an integrated hinge component (not shown) for attachment of a temple bar as described for the double ratcheting clasp described above. The clasp has a single ratcheting pawl 52 with dual opposed ratchet teeth. Pawl 52 is attached to ratchet support post 53. The ratchet support post holds the ratchet pawl in place within the clasp. The end 54 of the ratchet post has a groove or protrusion to compliment and mate with the bevel or groove, respectively, of the intended lens. The teeth 55a and 55b on the upper and lower sides of ratchet pawl 52 are designed to compliment the ratchet ridges 2c, 3c in the rim straps and mate with them when the strap is inserted. The ratchet pawl 52 is connected to the ratchet post 53 at point 56 with a sufficient thickness of material and shape so that the ratchet pawl 52 will flex slightly allowing the rim strap to pass through the clasp. As the screw 51 is tightened its end 51e extends into the clasp interior chamber and presses one of the rim straps against the ratchet arm.

The above construction allows the rim strap to pass through the clasp in one direction but compressively pins the strap against the ratchet pawl teeth when tension is placed on the strap in the other direction. Further tightening of the screw 51 deflects the ratchet pawl 52 downward engaging and locking the ratchet arm teeth 55b against the lower rim strap. Complete tightening of the screw when both straps are inserted will drive the screw through the upper rim strap "permanently" locking the arm in place. This embodiment of the single ratchet clasp uses a screw located in the upper portion of the clasp. Alternatively the screw can be located in the bottom portion of the clasp for engaging the bottom rip strap. The upper strap will enter the clasp through opening or slot 59 and exit through opening 58. The bottom strap will enter through opening or slot 57 and also exit through opening 58. Unscrewing the screw releases the ratchet arm compression in order to allow the user to selectively pull back and disengage the ratchet arm from the rim straps. This will allow easy removal of the lens, or permit adjustment if the assembler accidentally inserted the strap too far making the rim enclosure too small. This embodiment of the clasp component of the invention has the advantage of permitting the design of smaller clasps, but the disadvantage of requiring a screw to assemble it.

The FIGS. 23–26 embodiment of the invention includes upper fixed top bar having fixed rims 59 and 60, and lower rim straps 61 and 62 each extending, respectively from the upper nose-bridge end and lower cheek end of nose-piece 71. Each outer end of rims 59 and 60 contain an integral ratcheting clasp 64 including openings and ratchet pawls which permit the insertion and locking engagement of the lower rim straps 61 and 62. This embodiment thus is of one-piece integral construction. The locking features are detailed in FIG. 25. The operation of ratchet mechanism or pawl 67 is similar to the operation of the double ratchet clasp described previously. Attached to the back side of the clasp portion of the upper rims are hinge components 65 (FIG.

23) for attachment of temples. The features of the lower rim straps are identical to those discussed for FIG. 1. The upper top bar rim portions 59, 60 of this embodiment of the invention have a fixed projection 70 extending over the top and upper edge of the face of the lens. The projections 70 continue around the rim on the sides of the nose-piece 71, and gradually taper off along the lower cheek area of the nosepiece. The projection 70 is designed to hide gaps between the lens and rim which may result from the insertion of lenses which do not perfectly match the shape or size of this standard upper rim all along its perimeter. FIG. 26 shows projection 70 clearly in cross section.

Figure 27:
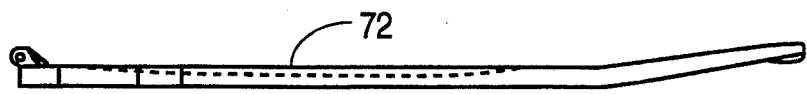
FIG. 27 is a top view of the eyeglass frame temple.
Figure 28:
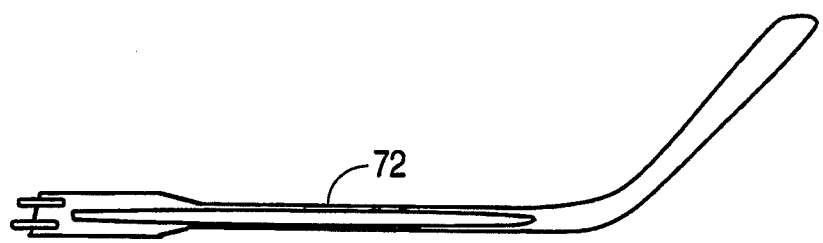
FIG. 28 is an inside view thereof.

FIGS. 27 and 28 show the eyeglass frame temple bars 72 which may be provided as part of the product or the temples of the broken frame may be used.

Material of Constructions

The variable dimension frame described herein may be manufactured from a synthetic plastics material such as nylon or polycarbonate, metal, or rubber materials having characteristics similar to the characteristics of nylon. In particular the material should have a high degree of flexibility particularly in a cross-section such as at the pawl root and in the thickness of the straps, but a relatively low level of elasticity.

DETAILED PROCEDURE FOR MOUNTING LENSES

©Copyright Jan. 12, 1993 by Nicholas G. Varveris

Assembly of the variable dimension eyeglass frame is discussed above. This section discusses a procedure for insuring that the lens is properly oriented within the frame. Proper orientation of the lens is important in order to avoid visual distortion or prism effects for wearers with astigmatic, bifocal or other prescribed optical lenses. For purposes of this discussion it is assumed that the preferred embodiment will be used. It is intended that a lay person can use these procedures and the variable dimension eyeglass frame to properly install an existing pair of lenses from an existing pair of eyeglasses (that were properly fit on them originally) without the use of any special tools. The procedure is predicated on replicating the fit of the user's existing frame.

Figure 29:
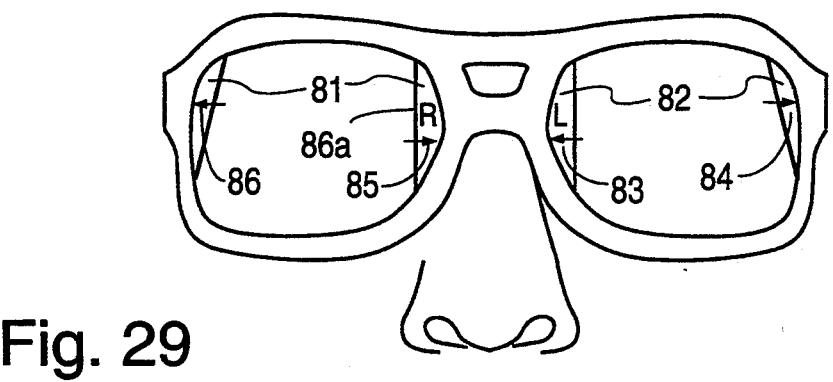
FIG. 29 is a front view of one type of a prior art frame.
Figure 30:
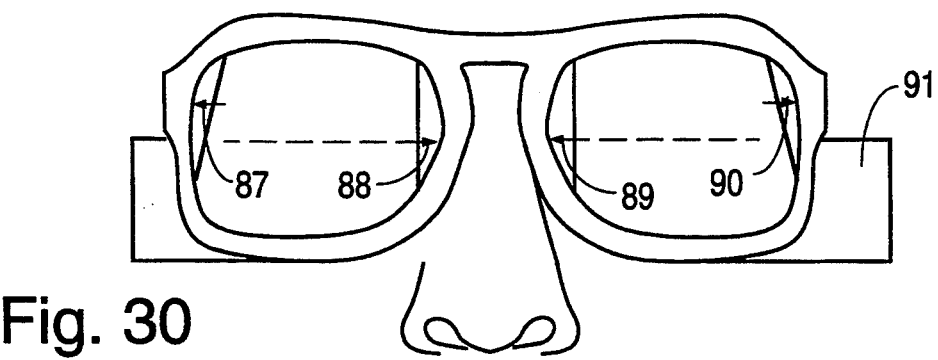
FIG. 30 is a front view of another type of prior art frame.
Figure 31:
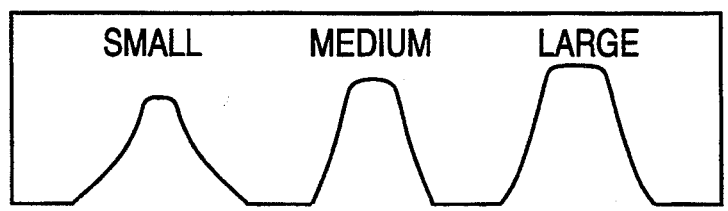
FIG. 31 is a front view of nose-bridge sizing card.
Figure 32:
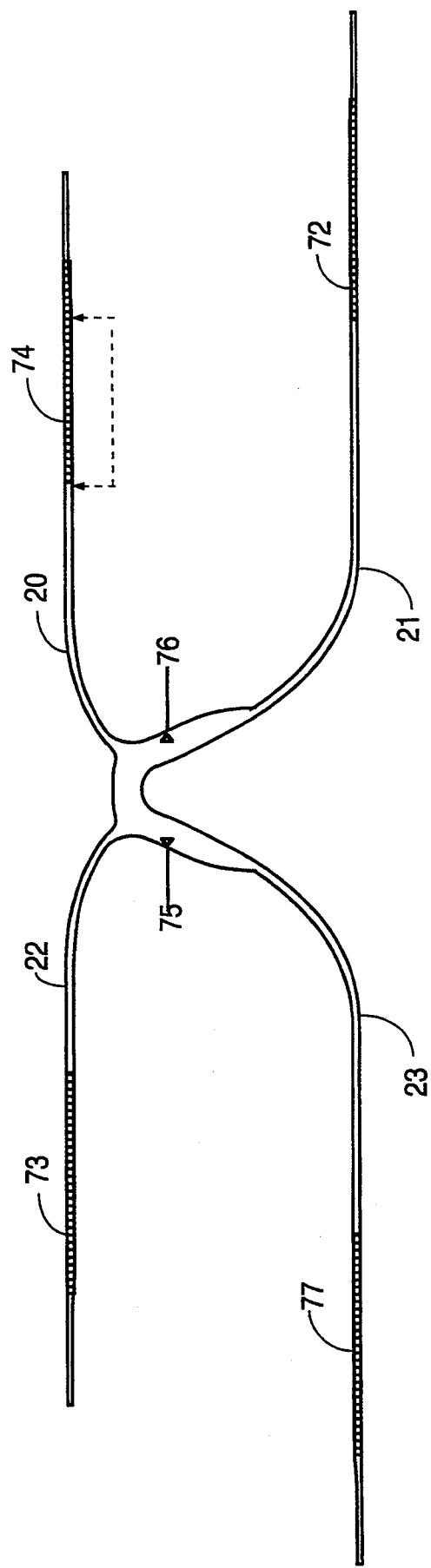
FIG. 32 is a rear view of the frame of FIG. 3.

The steps for this procedure are as follows:
1. The user must determine by visual inspection whether their existing frame has side mounted or corner mounted temples, and select the corresponding double ratchet clasp design, 29 in FIG. 14 or 46 in FIG. 18.
2. The user should next select the size of the nose bridge that best fits their particular size and shape of nose using a bridge sizing card FIG. 31 that has small, medium, and large bridge holes cut in it. The user should select the size which allows the bottom and sides of the bridge to rest comfortably on the top and sides of their nose. (This procedure can be skipped if the product is available in only a universal bridge size.)
3. The user should mark two reference points on the front of each lens. FIGS. 29 and 30 illustrate this procedure. To do this, small pieces of self-adhesive tape 81 and 82 should be placed along the edge of each lens near the bridge and temple portion of their existing frame or marks made directly on the lens by a non-permanent ink marker pen. The tape should be of a kind such as masking tape that can be written on and easily removed. While looking in a mirror indicia marks 83, 84, 85, and 86 should be made near the edge of each lens at the mid-point of each temple, and near the edge of each lens at the base of the bridge where it intersects with the nose unless permanent marks at such locations are present on the original lens. The user should also mark which lens is for the right eye 86a. In those cases where the existing frame's bridge does not rest on the user's nose FIG. 30, then the user should hold a ruler or stiff card 91 (FIG. 30) horizontally across the face of the lenses, while looking in a mirror, so its edge rests on the top of the nose and use this as a guide in making the appropriate marks.
4. The user should then remove their existing lenses from their old frame (possibly broken) by gently but firmly and safely pushing out the corner of each lens with their thumbs from the back. Wire frames may require the removal or loosening of screws near the temples. Removal from plastic frames may be easier if each lens portion of the old frame is first allowed to soak in a cup of hot water.
5. The variable dimension eyeglass frame should be assembled. The upper and lower rim straps should be inserted into the double ratcheting clasp openings just far enough to engage the ratcheting mechanism.

Figure 35:
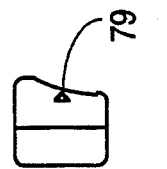
FIG. 35 is a back view of a clasp for side-mounted temples with hinge component detail omitted.
Figure 34:
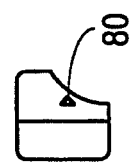
FIG. 34 is a back view of a clasp for corner-mounted temples with hinge component detail omitted.
Figure 33:
FIG. 33 is a plan view of the inner surface of a strap of FIG. 32.

FIGS. 32–35 show the plurality of lens positioning marks made on back of the FIG. 3 preferred embodiment of the invention. Specifically, the frame portion has lens positioning pointers 75 and 76 on the bridge portion of each rim at the point the bridge is intended to rest on the user's nose. FIG. 33 contains alternating groups of dash lines and dots 73 used to mark each ridge in the ratcheting section of each rim strap. The numbered portions 73, 74, 72 and 77 are ratcheted sections of rim straps that have markings. This will assist the user in quickly identifying the appropriate setting (i.e. length of rim strap) for a given shape of lens and duplicating that setting for both lenses or on a duplicate variable dimension eyeglass frame (for example of a different color). FIGS. 34 and 35 show the back of the double ratcheting clasps previously described (without picturing the hinge component). Each clasp has a lens positioning pointer 79 and 80, respectively, marking the center point of the temple near the lens engaging edge.

6. The user should insert the right lens in the right side of the frame and position the lens so that the bridge marking made on the old lens lines up with the lens positioning pointer on the variable dimension frame bridge. He or she should then wrap the upper rim strap around the perimeter of the lens and slowly pull the upper rim strap through the clasp until the lens positioning pointer on the clasp is aligned with the temple marking on the old lens.
7. The lower rim strap should be gradually pulled through the clasp until the lens is held firmly in position. To insure an even tighter fit the lens can be removed and the strap tightened further by one or two "clicks" or ridges through the ratchet. The lens can then be reinserted by pressing the rim straps on to the perimeter of the lens while being careful to align the lens positioning pointers and marks.
8. Once one lens is inserted the ridge marks on the sides of the rim straps can be used to duplicate the location of the clasp for the other lens.
9. Attach the temple bars to each clasp.

10. The user should then put on the glasses and review the fit in the mirror. The alignment of the lens positioning pointers and marks should be confirmed. The frame should fit squarely on the face. Adjustments may be made by using a pen point or other probe to pull back and release one of the clasp ratchet arms if one of the rim straps has been over tightened.

11. Once satisfied with frame fit and lens alignment remove the excess rim strap using a scissors or nail clipper. In addition, remove the pieces of tape used to mark the front of the lens. Before doing so, the user may wish to permanently mark these locations on the edge of the lens bevel with a permanent marker. This will eliminate the need for step 3 above in any future installations.

12. If desired, the clasp side cap 9 (FIG. 2) can then be inserted into the clasp opening. (End of Detailed Procedure)

In another aspect of the invention, the above indicia marks at the temples and nose-piece may be permanently provided by notches, marks or dimples by the original maker of the optically-fashioned lenses. Such marking involves a method of preparing eyeglass lenses suitable for use in different eyeglass frames such as the temporary eyeglass frames discussed above, particularly involving the steps of preparing a pair of eyeglass lenses for the user; determining a first point on the edge periphery of each lens representative of a position indicative of the mid-point of a temple portion of an eyeglass frame in which said lens are to be inserted; permanently marking said first point on said lenses; determining a second point on the edge periphery of each lens representative of a position indicative of where a nose-piece of the eyeglass frame intersects a user's nose; and permanently marking said second point on said lenses, such that said markings at said first and second points can be utilized when inserting and aligning the so-marked lenses into a new frame.

The above description of embodiments of this invention is intended to be illustrative and not limiting. Other embodiments of this invention will be obvious to those skilled in the art in view of the above disclosure.

What is claimed is:

1. An eyeglass frame for a pair of glass lenses comprising a nose-piece, a pair of ratcheting clasps and a pair of flexible straps extending from said nose-piece, said straps having ratchet means on a surface thereof, such that said straps are wrappingly placeable around a periphery of a respective one of said lenses and an end of said straps containing said ratchet means cinched in a respective one of said ratcheting clasps to firmly hold said lenses in said frame.

2. The eyeglass frame of claim 1 wherein said ratcheting clasps comprise a body portion having an elongated slot, at least one flexible pawl extending into said slot and wherein said flexible straps are insertible into said slot such that said at least one pawl intermeshes with said strap ratchet means at a position on said strap ratchet means to firmly hold said lenses.

3. The eyeglass frame of claim 2 wherein a pair of said pawls are integrally included in each of said ratcheting clasps.

4. The eyeglass frame of claim 3 further comprising a pair of plugs extending into each respective one of said ratcheting clasps for securing said pawls against said ratchet means.

5. The eyeglass frame of claim 2 further comprising means on each of said ratcheting clasps for mounting a temple bar thereon and wherein said at least one pawl includes means for disengaging said pawl from an inserted strap.

6. The eyeglass frame of claim 2 wherein a single flexible pawl extends into each of said slots of said ratcheting clasps.

7. The eyeglass frame of claim 1 wherein said strap ratchet means extend transverse of the longitudinal axis of said straps.

8. The eyeglass frame of claim 1 wherein said nose-piece is integral with said straps.

9. The eyeglass frame of claim 8 further including means in said straps for bending said strap at a position adjacent to said nose-piece.

10. The eyeglass frame of claim 1 wherein each of said ratcheting clasps are integral with an intermediate portion of said frame between each of said straps and said nose-piece and a distal end of each of said straps is insertible into said ratcheting clasps to grasp a respective lens.

11. The eyeglass frame of claim 1 wherein said straps include a longitudinal groove on an inner-facing surface for receiving a bevelled periphery of said lenses.

12. The eyeglass frame of claim 1 wherein said straps include a bevel for mating with a grooved periphery of said lens.

13. The eyeglass frame of claim 1 including a fixed top bar extending from an upper nose bridge end of said nose-piece and wherein said ratcheting clasps are connected to opposite ends of said top bar.

14. The eyeglass frame of claim 1 wherein said ratcheting clasps include means for mounting a temple bar.

15. The eyeglass frame of claim 1 wherein said ratcheting clasps and said straps are of plastics construction.

16. The eyeglass frame of claim 15 wherein said ratcheting clasps and said straps are of integrally constructed nylon plastic.

17. The eyeglass frame of claim 1 wherein said straps have a tapered distal end to facilitate entry of said straps into said ratcheting clasps.

18. The eyeglass frame of claim 1 wherein said straps have a variable cross-section.

19. An eyeglass frame for a pair of lenses comprising a central nose-piece including nose pads and having an upper nose bridge end and a lower cheek end;

a pair of oppositely disposed integral flexible straps extending laterally from opposite sides of said bridge end;

a pair of oppositely disposed integral flexible straps extending laterally from opposite sides of said cheek end;

each of said straps having a ratchet surface displaced from said nose-piece; and a pair of ratcheting clasps positioned such that each of said straps is wrappable around a periphery of said lenses and distal ends of the straps extending from one lateral side of said nose-piece are insertible into one of said clasps and the straps on another lateral side of said nose-piece are insertible into the other of said clasps such that cinching of said distal ends into such clasps interlocks said ratchet surfaces in a respective one of said clasps to firmly hold such lenses in the resultant frame.

20. The eyeglass frame of claim 19 wherein a root portion of each of said straps extending from said bridge end includes means for bending the strap around an upper outer periphery of said lenses.

21. The eyeglass frame of claim 19 wherein each of said ratcheting clasps are integral with an intermediate portion of said frame extending from said nose-piece and a distal end of each of said straps is insertible into said ratcheting clasps to grasp a respective lens.

22. The eyeglass frame of claim 19 wherein said straps include a longitudinal groove on an inner-facing surface for receiving a bevelled periphery of said lenses.

23. The method of mounting eyeglass lenses in a frame having a nose-piece; at least one pair of flexible straps extending from the nose-piece and wherein each strap has a ratchet surface; and a pair of ratcheting clasps and method comprising:
   inserting a lens into said nose-piece;
   wrapping a strip around a periphery of the lens;
   ratcheting said strap ratchet surface with and through said ratcheting clasp to firmly hold said lens; and
   cutting off an excess of a distal end of said strap extending from said ratcheting clasp.

24. The method of claim 23 further comprising adjusting the position of the straps with respect to the nose-piece and the ratcheting clasps such that the optical center of the lens is generally aligned with respect to the user's eye pupil.

25. The method of a user fitting and replicating the positioning of existing lenses of an existing eyeglass frame having a left and right temples and a nose-piece into a new frame comprising:
   while looking in a mirror with the glasses normally positioned on the user's face, placing indicia marks adjacent the edge of each lens at the mid-point of each temple portion of the existing frame, adjacent to the nose-piece where the nose-piece intersects the nose, and identifying the right or left lens; said indicia marks being placed either directly on said lens or on a marking tape affixed to the lens;
   removing the existing lenses from the existing frame;
   providing a variable dimension new frame having rim straps including ratcheting means for ratcheting the straps into a ratchet clasp and where said new frame includes positioning pointers at a position where a new frame nose-piece would intersect the user's nose and at a position in a new frame clasp;
   inserting the existing lenses into the new frame and aligning the indicia marks on the existing lenses with the new frame positioning pointers; and
   pulling the rim straps through said ratchet clasp to firmly hold said lenses in an aligned position in the new frame.

* * * * *